US008588617B2

(12) United States Patent
Vaillon et al.

(10) Patent No.: US 8,588,617 B2
(45) Date of Patent: Nov. 19, 2013

(54) OPTICAL TRANSCEIVER ASSEMBLY WITH TRANSMISSION-DIRECTION CONTROL

(75) Inventors: Ludovic Vaillon, Toulouse (FR); Gilles Planche, Aigrefeuille (FR)

(73) Assignee: Astrium SAS, Paris (FR)

( * ) Notice: Subject to any disclaimer, the term of this patent is extended or adjusted under 35 U.S.C. 154(b) by 659 days.

(21) Appl. No.: 12/574,404

(22) Filed: Oct. 6, 2009

(65) Prior Publication Data

US 2010/0158536 A1      Jun. 24, 2010

(30) Foreign Application Priority Data

Oct. 6, 2008  (FR) ...................................... 08 56748

(51) Int. Cl.
*H04B 10/00* (2013.01)

(52) U.S. Cl.
USPC ........................... 398/122; 398/129; 398/131

(58) Field of Classification Search
USPC ................................................ 398/118–131
See application file for complete search history.

(56) References Cited

U.S. PATENT DOCUMENTS

| | | | |
|---|---|---|---|
| 3,942,894 A | | 3/1976 | Maier et al. |
| 5,119,225 A | * | 6/1992 | Grant et al. .................... 398/123 |
| 5,517,016 A | * | 5/1996 | Lesh et al. ................. 250/201.1 |
| 5,592,320 A | * | 1/1997 | Wissinger ...................... 398/121 |
| 5,953,146 A | * | 9/1999 | Shelby ........................... 398/131 |
| 6,086,209 A | * | 7/2000 | Miyahara et al. .............. 359/872 |
| 6,118,131 A | * | 9/2000 | Korevaar .................... 250/559.3 |
| 6,155,690 A | * | 12/2000 | Miyahara et al. .............. 359/872 |
| 6,175,451 B1 | * | 1/2001 | Iriyama et al. ................. 359/627 |
| 6,398,425 B2 | * | 6/2002 | Williams et al. ................. 385/89 |
| 6,839,519 B1 | * | 1/2005 | Kleiner et al. ................. 398/121 |
| 6,915,080 B2 | * | 7/2005 | Heminger et al. ............. 398/129 |
| 7,133,617 B2 | * | 11/2006 | Oettinger et al. ............. 398/123 |
| 7,236,706 B2 | * | 6/2007 | Shikakura et al. ............. 398/129 |
| 7,292,788 B2 | * | 11/2007 | Triebes et al. ................. 398/122 |
| 7,292,789 B1 | * | 11/2007 | Capots et al. ................. 398/125 |
| 7,346,282 B2 | * | 3/2008 | Sakanaka et al. ............. 398/130 |
| 7,545,562 B2 | * | 6/2009 | Chen et al. .................... 359/399 |
| 7,587,141 B2 | * | 9/2009 | Fisher et al. .................. 398/128 |
| 7,643,755 B2 | * | 1/2010 | Rafferty et al. ............... 398/131 |
| 7,689,127 B1 | * | 3/2010 | Beffa ............................ 398/122 |

(Continued)

FOREIGN PATENT DOCUMENTS

| | | |
|---|---|---|
| EP | 0607906 A | 7/1994 |
| JP | 8079175 A | 3/1996 |
| JP | 2005333207 A | 12/2005 |

OTHER PUBLICATIONS

French Preliminary Search Report FR0856748; report dated May 27, 2009.

*Primary Examiner* — Agustin Bello
(74) *Attorney, Agent, or Firm* — Miller, Matthias & Hull LLP (57) ABSTRACT

An optical transceiver assembly comprises a transmission system, a reception system and a coupling system which directs a part of the signals produced by the transmission system to the reception system. Said part of the transmission signals is detected by a photodetector matrix of the reception system, outside an useful zone of the matrix which is dedicated to the detection of the received signals. A transmission direction may therefore be determined in real time while the received signals are detected. A difference between the transmission direction and a reception direction of the transceiver assembly may then be precisely compensated for at each moment during a tracking step. The transceiver assembly may be a free space laser optical communication terminal.

21 Claims, 4 Drawing Sheets

(56) References Cited

U.S. PATENT DOCUMENTS

| | | | |
|---|---|---|---|
| 7,711,441 B2* | 5/2010 | Tillotson | 700/59 |
| 8,009,991 B2* | 8/2011 | Morris et al. | 398/129 |
| 8,311,414 B2* | 11/2012 | Niiho et al. | 398/129 |
| 2002/0080452 A1* | 6/2002 | Sakanaka | 359/172 |
| 2002/0131121 A1* | 9/2002 | Jeganathan et al. | 359/152 |
| 2002/0171896 A1* | 11/2002 | Clark et al. | 359/172 |
| 2004/0264971 A1* | 12/2004 | Koontz | 398/122 |
| 2012/0121271 A1* | 5/2012 | Wood | 398/118 |

* cited by examiner

FIG. 3

OPTICAL TRANSCEIVER ASSEMBLY WITH TRANSMISSION-DIRECTION CONTROL

CROSS-REFERENCE TO RELATED APPLICATIONS

This application claims priority under the Paris Convention to French Patent Application No. 08 56748, filed on Oct. 6, 2008.

FIELD OF THE DISCLOSURE

The present invention relates to a transceiver assembly which is capable of measuring and compensating for, in a continuous and autonomous manner, the angular difference between the direction of transmission and that of reception.

BACKGROUND OF THE DISCLOSURE

It applies in particular to a free space laser optical communication terminal.

Free space laser optical communication is used for transmitting data between two points which may move relative to one another. For example, it may be used for a communication between two artificial satellites, between a satellite and an aircraft, a satellite and a ground terminal, etc.

In this transmission method, two terminals that are in mutual communication each produce a laser beam towards the other terminal. Each terminal is simultaneously a transmitter and a receiver, so that the data may be transmitted in both directions between the two terminals. The data are encoded in an appropriate manner for being transmitted in the form of laser beam pulses. Even if one of the terminals has no data to transmit momentarily, it nevertheless generates a beacon signal which is used for the pointing of the other terminal.

An optical communication terminal therefore comprises a laser-signal transmission system which produces and transmits such signals in a transmission direction. It also comprises a reception system which makes it possible to detect laser signals which originate from a determined direction, called the reception direction. Variations in this reception direction are caused by the relative movement of the two terminals during the communication connection, and by changes in attitude of the carrier on which the terminal is used. These variations are detected continuously by changes in the focusing point of the received laser signals on a matrix of photodetectors which is included in the reception system. The transmission direction of the terminal is then adjusted according to the variations in the reception direction, so that the laser beam of the transmitted signals passes through the reception pupil of the other terminal. Such pointing operation of a terminal occurs during the communication phase which corresponds to the transmission of the data. This phase is commonly called the tracking step. During this step, the pointing of each terminal is maintained in the direction of the other terminal despite the relative movement of the two terminals and their respective attitude movements.

More precisely, the transmission direction is computed based on the reception direction by adding to the latter an angular deviation and an angle of forward pointing, often referred to as the point-ahead angle. In a known manner, the angular deviation compensates for a lack of parallelism between the transmission and reception directions. The point-ahead angle corresponds to the relative movement of the two terminals during the round-trip transmission of the laser signals. It is computed by combining, in a reference inertial frame, the propagation speed of the laser signals with the respective speeds of the two terminals.

The co-alignment angle, i.e. the angle between emission and reception directions is measured after the terminal has been placed in its operating situation, for example once the satellite on board which it is installed is in its final orbit. This measurement is usually repeated before each communication session, in order to get rid of the deformations due to the temperature changes of the terminal. A retractable reflector is then placed temporarily at the exit of the transmission system in order to send to the reception system a part of the beam that is generated by this transmission system. The detection of this part of the transmission laser beam on the photodetector matrix makes it possible to measure the co-alignment angle.

When one and same entrance optical system is used within a terminal both for collecting the laser signals that are received and for transmitting the laser signals that are produced by the transmission system, the reflector is a retroreflector which can be placed between this entrance optical system and an optical separating system of the respective paths of the received signals and the transmitted signals. Such a separating system separates the optical path of the signals that are received, in the direction of the photodetector matrix, from the optical path of the signals that are transmitted and that originate from the transmission source inside the terminal. In a known manner, such a retroreflector may advantageously be formed of three planar mirrors that are arranged like a corner cube. Indeed, the direction of reflection of such a retroreflector does not vary according to an involuntary inclination of the retroreflector.

The co-alignment angle is measured when the reflector is placed in the path common to the transmitted and received signals, then the reflector is withdrawn once the measurement is complete. Such a measurement of the angular deviation cannot be performed during a tracking step, because the reflector at least partially obscures the optical entrance field of the terminal. The value of the angular deviation that has been measured is then used during a fixed tracking duration.

But the exact value of the co-alignment angle may vary continuously, for example under the effect of temperature changes. A pointing error then results from the use of one and same co-alignment angle value for a prolonged duration. Periodically repeated measurements of this angle would reduce the time that is actually available for data transmission.

To use continually an exact value of the angular deviation, document U.S. Pat. No. 5,517,016 proposes permanently reflecting a part of the signals that are transmitted by the terminal to the photodetector matrix of the reception system. In this manner, the actual value of the angular deviation can be measured permanently during the pursuit step. But the part of the transmitted signals that is reflected is superposed, on the photodetector matrix, on the signals that originate from the partner terminal in the communication connection. Errors result from this in the decoding of the received data.

SUMMARY OF THE DISCLOSURE

One object of the present invention is therefore to allow a permanent measurement of the angular deviation during the tracking step, without hampering the detection of the signals that are received.

For this purpose, the invention proposes an optical transceiver assembly which comprises:

a system for transmitting first optical signals, suitable for transmitting these first signals in a transmission direction;

a system for receiving second optical signals, itself comprising a matrix of photodetectors arranged to detect the second signals received at a point in an useful zone of the matrix, each point of the useful zone corresponding to a reception direction of the second signals inside an entrance optical field of the reception system; and an optical coupling system, arranged in order to direct a portion of a beam of the first signals onto the photodetector matrix.

The transceiver assembly is characterized in that the coupling system is also arranged for directing the part of the beam of the first signals to at least one point of the photodetector matrix, which varies depending on the direction of transmission and which is located outside the useful zone of the said matrix.

The transceiver assembly also comprises a transmission control unit suitable for determining the direction of transmission based on coordinates of the point or points of the photodetector matrix at which the part of the beam of the first signals is detected.

Because the part of the beam of the first signals is directed to the photodetector matrix outside the zone of the latter which is used for detecting the received signals, the two detections, of the received signals and of the part of the transmitted signals that is diverted, can be made simultaneously. In other words, the second signals may be detected inside the useful zone of the photodetector matrix, at the same time as the part of the first signals that is directed by the coupling system to the photodetector matrix is itself detected outside the useful zone of the matrix. Specifically, the part of the transmitted signals that is detected is not superposed on the matrix onto the signals that are received, and the latter can be detected without difficulty. Therefore, the transmission direction, and therefore the angular deviation between the transmission direction and that of reception, can be determined throughout a tracking step. The transmission of the first signals may then be carried out while, in real time, compensating exactly for the true angular deviation between the two directions, the transmission and reception directions.

In addition, the time that is available for data transmission during the tracking step is not reduced in order to determine the transmission direction.

The useful zone of the photodetector matrix may correspond to an entrance optical field of the reception system during an acquisition operation of the transceiver assembly.

According to a first improvement of the invention, the coupling system may be suitable for directing the part of the beam of the first signals simultaneously to several points of the photodetector matrix, these points varying according to the direction of transmission and being located outside the useful zone of the matrix. In this case, the transmission control unit may be suitable for determining the direction of transmission by computing a centroid of the points of the photodetector matrix at which the portion of the beam of the first signals is detected. The transmission direction, or the co-alignment angle, can therefore be determined with greater accuracy.

According to a second enhancement of the invention, the coupling system may comprise an assembly of several reflectors that are joined together. These reflectors are then arranged to reflect to the photodetector matrix the part of the first signals that is used to determine the transmission direction. Such an embodiment is simple and lightweight.

In particular, the assembly of reflectors may comprise three planar mirrors that are arranged in order to form a trihedron. An internal aperture of the trihedron may then contain a corner cube which has an apex common with the trihedron. In other words, the trihedron of the three planar mirrors that are used for the invention is more open than the corner cube.

For such a construction of the coupling system, at least one of the three mirrors may be tilted at an angle that is greater than the entrance optical field aperture angle of the reception system, relative to the corresponding face of the corner cube.

In a preferred embodiment of the invention, the reflector assembly of the coupling system consists of three planar mirrors that are arranged in a corner, and that are each tilted at the same additional angle relative to an arrangement in a corner cube. The part of the beam of the first signals that is directed to the photodetector matrix then consists of six individual beams. These individual beams may be distributed angularly in a symmetrical manner relative to a centre optical axis of the matrix. In this case, the angular deviation of each of the individual beams, relative to the centre optical axis of the photodetector matrix, is approximately 4.6 times the additional angle of inclination of each mirror of the reflector assembly.

According to a third enhancement of the invention, the coupling system may also comprise a device for attenuating the part of the beam of the first signals that is directed by the coupling system to the photodetector matrix. Such an attenuation device adjusts a power of this part of the beam of the first signals. It is therefore possible to prevent saturation of the photodetectors of the matrix at detection point(s) of the part of the beam of the first signals that is returned by the coupling system. The attenuation device may in particular comprise an absorbing plate.

According to a fourth enhancement of the invention, the coupling system may also comprise a device for suppressing an a straylight signal which is produced by the reflector assembly and which might reach the inside of the useful zone of the photodetector matrix. Such a suppression device may in particular comprise a diaphragm placed to block this straylight signal.

BRIEF DESCRIPTION OF THE DRAWINGS

Other particular features and advantages of the present invention will appear in the following description of several non-limiting examples of embodiments, with reference to the appended drawings, in which.

DETAILED DESCRIPTION OF THE DISCLOSURE

Figure 1A:
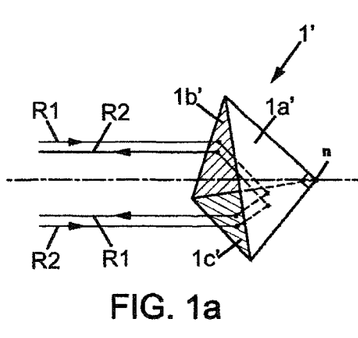
FIG. 1a represents a retroreflector in a corner cube configuration as known in the prior art.

To make it easier to understand a retroreflector that may be used in the present invention, a known retroreflector of the prior art is first described with reference to FIG. 1a. This retroreflector, which is given the overall reference 1', consists of three planar mirrors 1a', 1b' and 1c'. Each mirror has the shape of a right-angled isosceles triangle. The mirrors are placed so as to form a corner cube: they have edges that are contiguous with each other, and the three mirrors have their respective right angles that are joined together to form the apex of the cube marked Σ. In this situation, a ray R1 or R2 which enters through the aperture of the retroreflector 1' is reflected successively by the three mirrors 1a', 1b' and 1c' and comes out parallel to itself. The direction of emergence of each ray is independent of the order of the respective reflections of the ray on the mirrors 1a', 1b' and 1c'. In practice, the two angles of each of the mirrors 1a', 1b' and 1c' that are not situated at the apex Σ are cut off, in order to prevent rays from entering the retroreflector but undergo no reflection other than on one or two mirrors only, instead of the three mirrors. The useful pupil of the retroreflector cut in this way is a hexagon. For the purposes of clarity, FIGS. 1a and 1b do not show such cuts of the retroreflector mirrors, which are known to those skilled in the art.

Figure 1B:
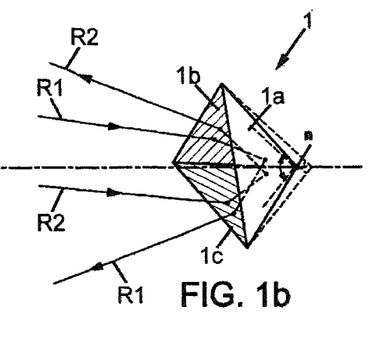
FIG. 1b represents an example of a retroreflector that may be used to implement the present invention.

FIG. 1b represents a retroreflector that may be used to embody the present invention. It is given the general reference 1 and again comprises three planar isosceles mirrors, 1a, 1b and 1c. The structure of the retroreflector 1 can be deduced from that of the retroreflector 1' of FIG. 1a by moving the apex Σ towards the aperture of the retroreflector. In this case, the angles at the apex of the mirrors 1a, 1b and 1c are each greater than 90 degrees. Therefore, the trihedron that is formed by the three mirrors 1a, 1b and 1c has an internal aperture that is greater than that of the corner cube when the latter is translated following the apex Σ.

In this situation, a ray R1 which enters the retroreflector 1 goes out from it in a direction that is different from its direction of incidence. In addition, the orientation of the direction of emergence relative to the direction of incidence depends on the order in which the three mirrors 1a, 1b and 1c successively reflect the ray. For this purpose, the tracks of the two rays R1 and R2 in FIG. 1b will be compared. One and same incident beam that is reflected by the retroreflector 1 is therefore divided into several reflected beams that are angularly separated depending on the tilts of the three mirrors 1a, 1b and 1c. The reflected beams are distinguished by the order of the reflections on the three mirrors 1a, 1b and 1c. The configuration of the retroreflector 1 of FIG. 1b therefore produces six beams reflected from one and same incident beam.

The three mirrors 1a, 1b and 1c of the retroreflector 1 of FIG. 1b are turned symmetrically, each relative to the corresponding mirror 1a', 1b' and 1c'. In this case, the six reflected beams are distributed symmetrically over a cone that is centred on the direction of the incident beam, and the half-angle of which at the apex is determined by the angular skew of the mirrors of the retroreflector relative to the corner cube. This half-angle at the apex is substantially equal to 4.6 times the common skew of the three mirrors.

Nevertheless, it is sufficient for the invention that at least one of the mirrors 1a, 1b and 1c is turned relative to the corresponding face of the corner cube which is contained in the aperture of the retroreflector 1.

As will be described below, the value of the angular skew of the mirror(s) of the retroreflector which is (are) turned to apply the invention, relative to the corresponding face of the corner cube, is chosen so that the part of the transmission beam that is reflected by the retroreflector is reflected with a deviation of more than a half aperture angle of the entrance optical field of the reception system.

As an illustration, the invention is now described in the context of communication by laser beam. The transceiver assembly to which the invention is applied is therefore a free space laser optical communication terminal.

FIGS. 2 to 5 illustrate three free space laser optical communication terminals which comply with the present invention. In these figures, identical reference numbers designate elements that are identical or that have identical functions. These figures are diagrams that illustrate the optical principles that are used, and allow those skilled in the art to reproduce each embodiment. In the following, the elements of operation of a free space laser optical communication terminal that are well known and are not modified by the invention are not repeated.

Figure 2:
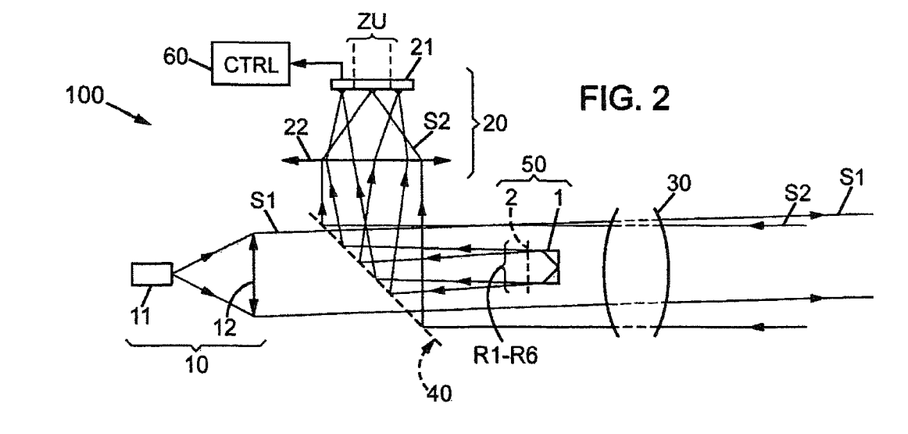
FIGS. 2 to 4 illustrate respectively three embodiments of optical communication terminals according to the present invention.
Figure 3:
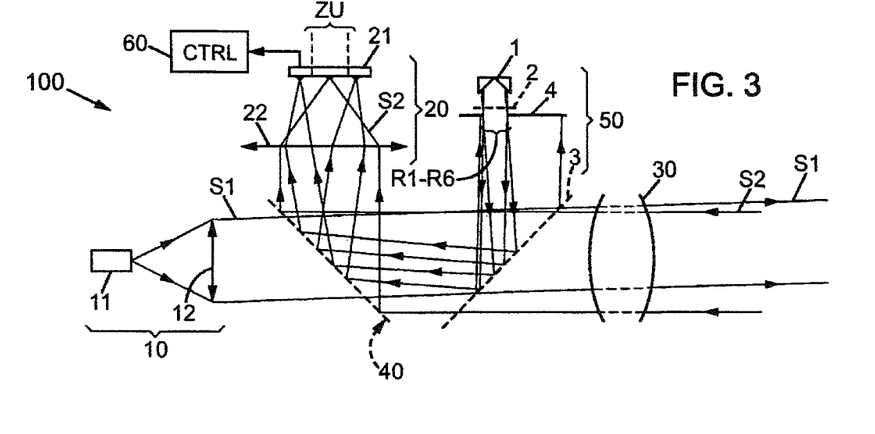
Figure 4:
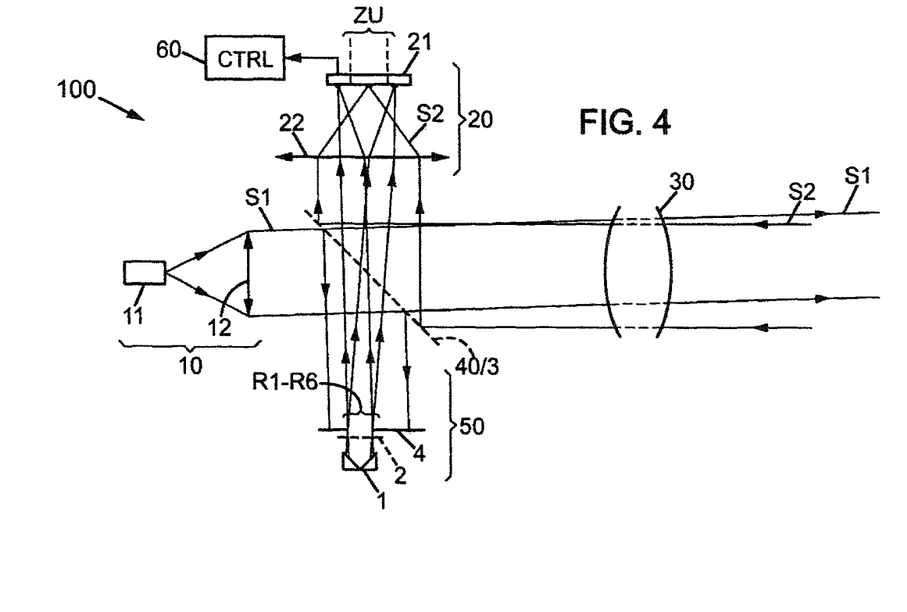

Each terminal comprises a laser signal transmission system 10, and a laser signal reception system 20. Typically, the transmission system 10 comprises a laser signal source 11 and a collimation optical system 12. The reception system 20 comprises a photodetector matrix 21 and focusing optics 22. The matrix 21 is placed in the image-formation plane of the optics 22. Reference number 100 indicates the terminal in its entirety.

The laser beam of the signals that are generated by the source 11 is marked S1. The source 11 and the optical system 12 are preferably arranged so that the beam S1 has a parallel structure after the optical system 12. The laser beam of the signals that are received by the terminal, from another optical communication terminal external to the terminal 100, is marked S2. In the following description, for reasons of simplicity, S1 and S2 may also denote the signals that are transmitted and received by the terminal, respectively, also called the first signals and second signals in the first part of the description of the invention.

For the three embodiments, but in a manner that is not indispensible to the invention, the terminals described each have an optical entrance that is common to the transmission system and to the reception system. This optical entrance, which may be a telescope lens, is assigned the overall reference 30 without the detail of its structure being shown. Each terminal then also comprises an optical separating system 40 which is situated between the optical entrance 30 and the transmission source 11 on the one hand, and between the optical entrance 30 and the photodetector matrix 21 on the other hand. The separating system 40, which may be a semi-reflecting plate, is adapted to transmit the signals S1 that are produced by the source 11 to the optical entrance 30, and the received signals S2 that go through the optical entrance 30 to the photodetector matrix 21. Specifically, the optical entrance 30 belongs functionally both to the transmission system 10 and to the reception system 20. For such a structure of an optical communication terminal with an optical entrance that is common to the two transmission and reception paths, the coupling system that is introduced according to the invention forms a retroreflector for the part of the beam of the transmitted signals S1 that is directed to the photodetector matrix.

According to FIG. 2, the terminal 100 comprises a retroreflector 1 that is situated between the optical entrance 30 and the optical separation system 40, over a path segment that is common to the transmitted signals S1 and the received signals S2. The retroreflector 1 may be of the type shown in FIG. 1b. Preferably, it has a cross section that is reduced in order to prevent masking the beam S1 of the transmitted signals in a significant proportion.

The retroreflector 1 therefore selects a part of the beam of the transmitted signals S1, which it reflects in the form of six secondary beams that are referenced respectively R1 to R6. The beams R1-R6 are reflected to the semi-reflecting plate 40 then to the photodetector matrix 21 through the focusing optics 22. Each of them then forms a spot of light on the matrix 21, the position of which depends on the transmission direction of the system 10.

Figure 5:
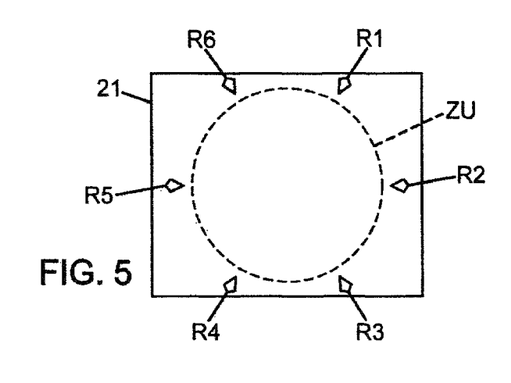
FIG. 5 illustrates a use according to the invention of the detection surface of a photodetector matrix.

In addition, the respective directions of the reflected beams R1-R6 are angularly offset from one another in the manner that has been explained above with reference to FIG. 1b. As a result of this offset, the spots that are formed on the matrix 21 by the beams R1-R6 are situated outside the central zone of the matrix that is dedicated to the detection of the received signals S2, as shown in FIG. 5. The central zone of the matrix 21 that is dedicated to the detection of the signals S2 is marked ZU and called the useful zone. Each point of the useful zone ZU corresponds to a distinct reception direction for the signals S2, inside the input field of the reception system 20. The useful zone ZU may be the zone of the matrix 21 that is used during a tracking step, or preferably during an acquisition step. In the first case, its apparent angular diameter may be several tens of microradians and, in the second case, several milliradians. The offset of the spots corresponding to the beams R1-R6 outside the useful zone ZU is fixed by the inclinations of the mirrors 1a-1c of the retroreflector 1. For example, an angular skew that is greater than 0.5 mrad (milliradian) approximately and which is applied identically to the three mirrors 1a, 1b and 1c makes it possible to place the spots of the beams R1-R6 outside an useful zone ZU which corresponds to a half aperture angle of 2.5 mrad of the entrance field of the reception system 20.

Each spot of a beam R1-R6 may correspond to a single photodetector of the matrix 21, or several photodetectors, depending on the degree of collimation of the beam S1. A central point is determined for each spot, then a centroid of the respective central points of the spots is computed. The coordinates of this centroid then characterize the transmission direction of the system 10. The offset between the transmission direction that is thus determined and the reception direction of the signals S2, which is characterized by the point of impact of the latter inside the useful zone ZU, is the co-alignment angle.

For this purpose, the detection signals of the beams R1-R6 that are produced by the photodetector matrix 21 may be transmitted to a transmission controller 60, marked CTRL. The controller 60 determines the transmission direction by calculating the centroid of the detection points of the beams R1-R6. The transmission system 10 may also contain a variable deflector (not shown), which is arranged to modify the actual transmission direction. The controller 60 can then control this variable deflector in order to compensate for the co-alignment angle that has been determined. Therefore, the co-alignment angle between the respective transmission directions of the system 10 and reception directions of the system 20 can be determined and compensated for in real time, at the same time as the signals S2 are detected in the useful zone ZU of the matrix 21.

Advantageously, an absorbing plate 2 may also be placed in front of the aperture of the retroreflector 1 in order to reduce the intensity of the spots of the beams R1-R6 on the matrix 21. The plate 2 makes it possible to adjust the intensity of the beams R1-R6 on the matrix 21 in the range of detection of the photodetectors.

The retroreflector 1 and the plate 2 together form the coupling system 50 which was introduced in the general description of the invention. The plate 2 therefore has a function of attenuating the beams reflected by the coupling system 50.

The second embodiment of the invention that is illustrated by FIG. 3 can be constructed based on the first embodiment of FIG. 2 by transferring the retroreflector 1 outside of the path segment that is common to the signals S1 and S2. The advantage of this second embodiment is that the portion of the beam S1 that is retroreflected is no longer determined only by the ratio between the section of the retroreflector 1 and the size of the transmission beam S1. In this case, the coupling system 50 also comprises a reflective device 3 which is placed between the optical entrance 30 and the optical separating system 40, on the common segment of the paths of the signals S1 and S2.

The device 3 is arranged to direct the part of the beam of the signals S1 to the retroreflector 1. For example, the device 3 may comprise a semi-reflecting plate. In this case, the latter advantageously extends across the whole section of the beam S1, in order to prevent its edges from generating straylight signals which could reach the useful zone ZU of the matrix 21. Alternatively, the plate 3 may extend over only a portion of the cross section of the beam of the signals S1.

Finally, the third embodiment of the invention that is illustrated by FIG. 4 can be constructed based on the second embodiment of FIG. 3 by combining the functions of the semi-reflecting plates 40 and 3. In other words, the system for separating the signals S1 and S2 is also adapted to transmit to the reflector assembly the part of the beam of the signals S1 that is used to determine the transmission direction. Those skilled in the art will understand the operation of this third embodiment in the light of the explanations that have been given above for the first and second embodiments, and in the light of FIG. 4.

According to an improvement of the embodiments of FIGS. 3 and 4, the coupling system 50 may also comprise a diaphragm 4 which is placed in front of the reflector assembly. Such a diaphragm stops a straylight signal which may be generated by the reflector assembly and which could reach the inside of the useful zone ZU of the photodetector matrix 21. Such a straylight signal could be produced, notably, by diffusing edges of the mirrors 1a, 1b and 1c. For the same reason, a mask of the edges of the mirrors 1a, 1b and 1c may be added to the embodiment of the invention of FIG. 2. Such a diaphragm or mask therefore has a function of suppressing the straylight signal generated by the reflector assembly.

In general, it is advantageous that the coupling system 50 diverts only a reduced portion of the beam of the signals S1 to the reception system 20 so as not to substantially reduce the power of the signals S1 that are actually transmitted to the outside of the terminal 100. Therefore, the coupling system 50 may advantageously be adapted so that the portion of the beam of the signals S1 that is directed by it to the photodetector matrix 21 represents a proportion of a power of the signals S1 generated by the transmission system 10 which is below 3%, preferably below 1%.

When the coupling system comprises a reflector assembly, such as the mirrors 1a, 1b and 1c, and is installed in the path that is common to the signals S1 and S2 as shown in FIG. 2, the coupling system must have a cross section that is considerably smaller than the size of the beams S1 and S2. The cross section of the retroreflector 1 is then preferably less than 20 $mm^2$, and even less than 7 $mm^2$, corresponding respectively to a diameter of the retroreflector 1 which is less than approximately 5 or 3 mm. This constraint disappears when the retroreflector 1 is transferred outside the path that is common to the signals S1 and S2, as in the embodiments of the invention that are illustrated by FIGS. 3 and 4. The portion of the beam S1 which is retroreflected may then be adjusted by means of the characteristics of the semi-reflecting plate 3.

It is understood that the invention may be reproduced by modifying the embodiments that have been described in detail above, while retaining at least some of the advantages that have been cited. Amongst these advantages, it is noted that the invention makes it possible to permanently determine the actual value of the alignment difference between the transmission and reception directions of the terminal. This difference may then be compensated for with precision in a continuous manner.

Figure 6A:
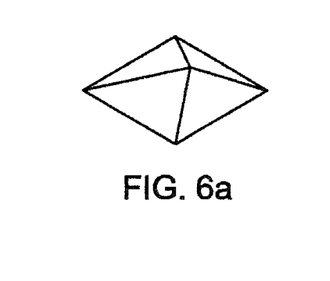
FIGS. 6a and 6b represent two other examples of retroreflectors that may be used to apply the present invention.
Figure 6B:
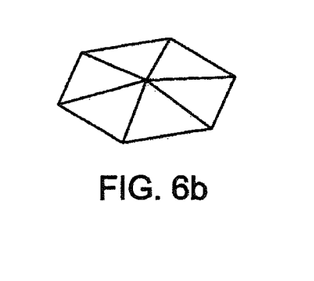

Amongst the modifications that may be introduced, the structure of the coupling device may be changed. FIGS. 6a and 6b represent two reflector assemblies that consist of several planar mirrors placed in a pyramid. In particular, the number of sides of the pyramid may be varied: four for FIG. 6a and six for FIG. 6b. However, the structure of the reflector assembly in a trihedron of FIG. 1b is preferred, because it creates less sensitivity to the operation of the invention than a general inclination of the reflector assembly.

When the reflector assembly is designed based on a corner cube, only one or two of the mirrors may be turned relative to the faces of the cube. Moreover, a retroreflector that generates several reflected beams from one and the same incident beam can also be obtained by combining a standard retroreflector in a corner of a cube according to FIG. 1a with deflecting prisms.

Also, the coupling system may be placed in front of or behind an input lens of the terminal 100, on the common path of the transmitted signals S1 and received signals S2.

Finally, although the invention has been described in detail in the context of free space laser communication, it may be applied similarly to any other optical transceiver assembly. Those skilled in the art will then be able to adapt certain particular characteristics, such as the dimensions of the optical coupling system, to the wavelength and the energy density of the radiation that is received in the transceiver mode used.

The invention claimed is:

1. An optical transceiver assembly comprising:
  a transmission system configured to transmit first optical signals in a transmission direction;
  an optical entrance configured to receive second optical signals generated outside of the transceiver assembly, the optical entrance configured to have an input field of a plurality of available reception directions for the received second optical signals;
  a reception system configured to receive the second optical signals and a part of a beam of the transmitted first optical signals, the reception system comprising a matrix that includes:
    a first plurality of photodetectors arranged in the matrix to form a first zone having an outer perimeter, the first plurality of photodetectors of the first zone collectively corresponding to all of the available reception directions of the input field of the optical entrance, each of the first plurality of photodetectors of the first zone individually corresponding to a different available reception direction of the input field, the first zone positioned on the matrix to receive the second optical signals and to exclude reception of the part of the beam of the first optical signals; and
    a second plurality of photodetectors arranged in the matrix to form a second zone, the second zone disposed on the matrix outside of the outer perimeter of the first zone, the second zone positioned on the matrix to receive the part of the beam of the first optical signals and to exclude reception of the second optical signals,
    wherein the first zone is different than the second zone and the perimeter of the first zone remains constant on the matrix for all available reception directions for the received second optical signals;
  an optical coupling system configured to direct the part of the beam of the first optical signals onto at least one point on the photodetector matrix in the second zone and to exclude direction of the part of the beam of the first optical signals onto the photodetector matrix in the first zone, the at least one point varying depending on the direction of transmission; and
  a transmission control unit configured to determine the direction of transmission based on coordinates of the at least one point in the second zone on the photodetector matrix at which the part of the beam of the first optical signals is detected.

2. The transceiver assembly according to claim 1, forming a free space laser optical communication terminal.

3. The transceiver assembly according to claim 1, configured to detect the second signals inside the first zone of the photodetector matrix, at the same time as the part of the first signals directed by the coupling system to said photodetector matrix is detected in the second zone of the matrix.

4. The transceiver assembly according to claim 1, in which the coupling system is configured to direct the part of the beam of the first signals simultaneously to several points of the photodetector matrix, said points varying according to the direction of transmission and being located in the second zone of said matrix,
  the transmission control unit configured to determine the direction of transmission by computing a centroid of the points of the photodetector matrix at which said part of the beam of the first signals is detected.

5. The transceiver assembly according to claim 4, in which the coupling system comprises an assembly of several joined reflectors.

6. The transceiver assembly according to claim 5, in which the coupling system also comprises an attenuation device arranged to adjust a power of the part of the beam of the first signals directed to the photodetector matrix by said coupling system.

7. The transceiver assembly according to claim 6, in which the attenuation device comprises an absorbing plate.

8. The transceiver assembly according to claim 5, in which the coupling system also comprises a device configured to suppress straylight signal produced by the reflector assembly and which might reach the inside of the first zone of the photodetector matrix.

9. The transceiver assembly according to claim 8, in which the suppression device comprises a diaphragm.

10. The transceiver assembly according to claim 5, in which the reflector assembly comprises three planar mirrors arranged to form a trihedron having an internal aperture which contains a corner cube having an apex common with said trihedron.

11. The transceiver assembly according to claim 10, in which at least one of the three planar mirrors of the reflector assembly is tilted, relative to a corresponding face of the corner cube, at an angle such that the part of the beam of the first signals is reflected with a deviation greater than a half aperture angle of the input field of the optical entrance.

12. The transceiver assembly according to claim 11, in which the three planar mirrors of the reflector assembly are each tilted, relative to the corresponding face of the corner cube, at an angle greater than or equal to 0.5 milliradians.

13. The transceiver assembly according to claim 5, in which the optical entrance is common with the transmission system and the reception system, the transceiver assembly also comprising an optical separating system situated between said optical entrance and a transmission source of the first signals on the one hand, and between said optical entrance and the photodetector matrix on the other hand, said separating system configured to transmit the first signals produced by the transmission source to the optical entrance and the second signals passing through the optical entrance to the photodetector matrix, the coupling system forming a retroreflector for the part of the beam of the first signals that is directed to the photodetector matrix.

14. The transceiver assembly according to claim 13, in which the reflector assembly is situated between the optical entrance of the transceiver assembly and the optical separating system, in a path segment common to the first and second signals.

15. The transceiver assembly according to claim 14, in which the reflector assembly has a cross section smaller than 20 mm², preferably smaller than 7 mm².

16. The transceiver assembly according to claim 13, in which the coupling system comprises a reflecting device placed between the optical entrance of the transceiver assembly and the optical separating system, in a path segment common to the first and second signals, and the reflector assembly is situated outside said common path segment, the reflecting device being arranged to direct the part of the beam of the first signals to the reflector assembly.

17. The transceiver assembly according to claim 16, in which the reflecting device comprises a semi-reflecting plate.

18. The transceiver assembly according to claim 13, in which the separating system is also configured to transmit the part of the beam of the first signals to the reflector assembly.

19. The transceiver assembly according to claim 1, wherein the first plurality of photodetectors in the first zone of the photodetector matrix corresponds to the input field of the optical entrance during an acquisition operation of said transceiver assembly.

20. The transceiver assembly according to claim 1, in which the coupling system is adapted so that the part of the beam of the first signals, which is directed to the photodetector matrix by said coupling system, represents a proportion of an energy of said first signals produced by the transmission system that is less than 3%, preferably less than 1%.

21. The transceiver assembly according to claim 1, wherein the second zone surrounds the outer perimeter of the first zone.

\* \* \* \* \*